US012648522B2

(12) United States Patent
Di Creddo Palharin et al.

(10) Patent No.: US 12,648,522 B2
(45) Date of Patent: Jun. 9, 2026

(54) SYSTEM AND METHOD FOR CONTROLLING THRESHING ASSEMBLY OPERATION OF AN AGRICULTURAL HARVESTER

(71) Applicant: CNH Industrial Brasil Ltda., Nova Lima (BR)

(72) Inventors: Luiz Henrique Di Creddo Palharin, Curitiba (BR); Rogerio Vidal Junior, Curitiba (BR)

(73) Assignee: CNH INDUSTRIAL BRASIL LTDA. (BR)

( * ) Notice: Subject to any disclaimer, the term of this patent is extended or adjusted under 35 U.S.C. 154(b) by 665 days.

(21) Appl. No.: 18/102,511

(22) Filed: Jan. 27, 2023

(65) Prior Publication Data

US 2023/0240189 A1     Aug. 3, 2023

(30) Foreign Application Priority Data

Jan. 28, 2022     (BR) ........................... 1020220016941

(51) Int. Cl.
| | |
|---|---|
| *A01F 12/10* | (2006.01) |
| *A01F 12/52* | (2006.01) |
| *A01F 12/58* | (2006.01) |

(52) U.S. Cl.
CPC .............. *A01F 12/10* (2013.01); *A01F 12/52* (2013.01); *A01F 12/58* (2013.01)

(58) Field of Classification Search
CPC .......... A01F 12/10; A01F 12/52; A01F 12/58; A01F 12/18; A01D 41/127
See application file for complete search history.

(56) References Cited

U.S. PATENT DOCUMENTS

| | | | |
|---|---|---|---|
| 4,441,513 A | 4/1984 | Herwig | |
| 8,282,453 B1 * | 10/2012 | Hillen | A01D 41/1276 340/684 |

(Continued)

FOREIGN PATENT DOCUMENTS

| | | |
|---|---|---|
| CN | 106441971 A | 2/2017 |
| JP | 2019010075 A | 1/2019 |

OTHER PUBLICATIONS

Extended European Search Report for EP Application No. 23153785.3 dated Jul. 3, 2023 (six pages).

*Primary Examiner* — Joseph M Rocca
*Assistant Examiner* — Jose Antonio Martinez
(74) *Attorney, Agent, or Firm* — Buchanan Ingersoll & Rooney PC

(57) ABSTRACT

An agricultural harvester includes a threshing assembly configured to thresh crop material received from a feeder of the agricultural harvester. The threshing assembly, in turn, includes a concave and a rotor positioned relative to the concave such that a gap is defined between the concave and the rotor. Furthermore, the agricultural harvester includes an actuator configured to move the concave relative to the rotor to adjust a size of the gap. Additionally, the agricultural harvester includes a tailings assembly configured to receive incompletely threshed crop material that has passed through the concave. Moreover, the agricultural harvester includes an imaging device configured to capture image data depicting the incompletely threshed crop material present within the tailings assembly and a computing system communicatively coupled to the imaging device. As such, the computing system is configured to determine an amount of the incompletely threshed crop material present within the tailings assembly based on the captured image data. In addition, the computing system is configured to control an operation (Continued)

of the actuator based on the determined amount of the incompletely threshed crop material present within the tailings assembly.

26 Claims, 5 Drawing Sheets

(56)  References Cited

U.S. PATENT DOCUMENTS

| | | | |
|---|---|---|---|
| 9,560,802 B1 * | 2/2017 | Palla ........................ | A01F 12/18 |
| 10,660,268 B2 * | 5/2020 | Dybro ................ | A01D 41/1271 |
| 10,827,683 B2 * | 11/2020 | Duquesne ............. | A01F 12/446 |
| 11,076,533 B2 * | 8/2021 | Banks, Jr. ............... | A01F 12/18 |
| 2013/0332003 A1 * | 12/2013 | Murray ................ | A01D 41/127 |
| | | | 701/1 |
| 2017/0013776 A1 | 1/2017 | Palla et al. | |
| 2019/0274254 A1 | 9/2019 | Banks, Jr. et al. | |
| 2020/0084966 A1 * | 3/2020 | Corban .................. | H04N 23/54 |
| 2021/0345551 A1 | 11/2021 | Banks et al. | |

* cited by examiner

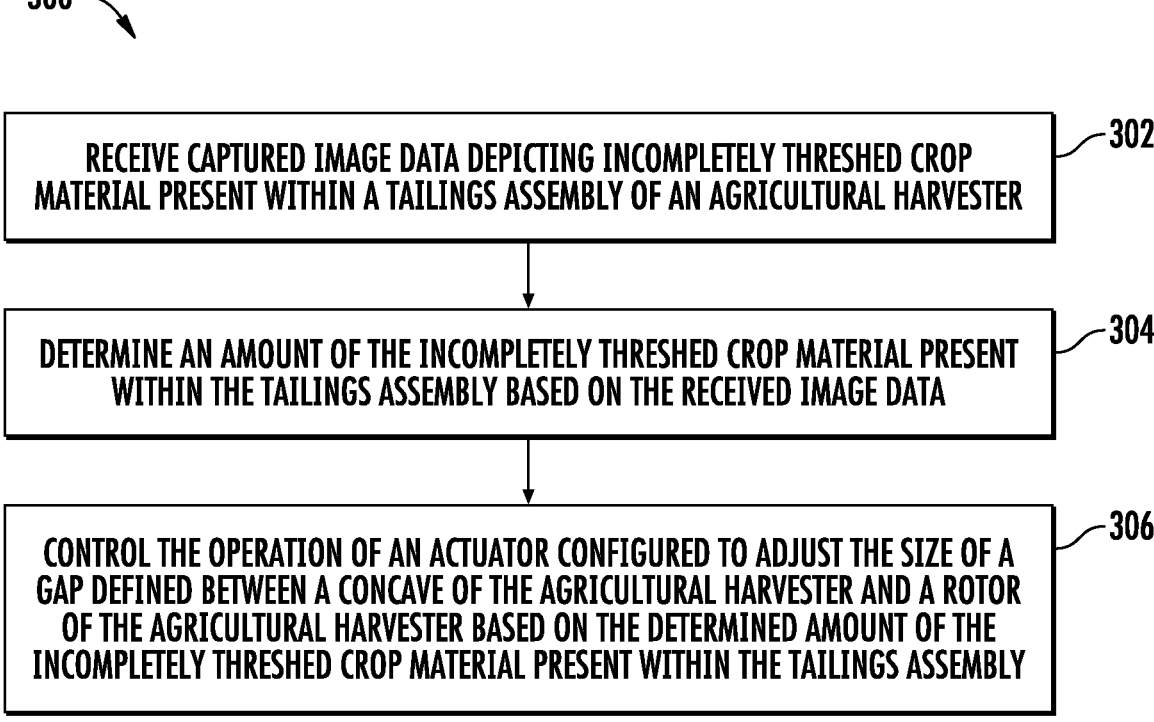

300

RECEIVE CAPTURED IMAGE DATA DEPICTING INCOMPLETELY THRESHED CROP MATERIAL PRESENT WITHIN A TAILINGS ASSEMBLY OF AN AGRICULTURAL HARVESTER — 302

DETERMINE AN AMOUNT OF THE INCOMPLETELY THRESHED CROP MATERIAL PRESENT WITHIN THE TAILINGS ASSEMBLY BASED ON THE RECEIVED IMAGE DATA — 304

CONTROL THE OPERATION OF AN ACTUATOR CONFIGURED TO ADJUST THE SIZE OF A GAP DEFINED BETWEEN A CONCAVE OF THE AGRICULTURAL HARVESTER AND A ROTOR OF THE AGRICULTURAL HARVESTER BASED ON THE DETERMINED AMOUNT OF THE INCOMPLETELY THRESHED CROP MATERIAL PRESENT WITHIN THE TAILINGS ASSEMBLY — 306

FIG. 5

SYSTEM AND METHOD FOR CONTROLLING THRESHING ASSEMBLY OPERATION OF AN AGRICULTURAL HARVESTER

FIELD OF THE INVENTION

The present disclosure generally relates to agricultural harvesters and, more particularly, to systems and methods for controlling the operation of a threshing assembly of an agricultural harvester.

BACKGROUND OF THE INVENTION

An agricultural harvester is a machine used to harvest and process crops growing within a field. For example, a combine harvester is a type of harvester used to harvest grain crops, such as wheat, oats, rye, barely, corn, soybeans, and/or the like. In general, most harvesters are equipped with a detachable harvesting implement, such as a header. In this respect, as the harvester travels across the field, the harvesting implement cuts and collects the crop from the field. The harvested crops are fed to a crop processing system of the harvester, which performs various processing operations (e.g., threshing, separating, cleaning, etc.) on the harvested crop. Thereafter, the processed crops are delivered to a crop tank of the harvester for storage.

The crop processing system generally includes a threshing assembly that threshes and separates the harvested crop. As such, the threshing assembly may include a concave and a rotor positioned relative to the concave such that a gap is defined therebetween. In this respect, as the rotor rotates relative to the concave, the harvested crop passes through the gap and is rubbed between the rotor and the inner surfaces of the concave to loosen and separate the grain, seed, or the like from the straw. When the gap is too small, the grain/seed being separated from the straw may be damaged. Conversely, when the gap is too large, large amounts of incompletely threshed crop material may pass through the concave and be discharged from the harvester onto the ground, thereby wasting grain/seed.

Accordingly, an improved system and method for controlling threshing assembly operation of an agricultural harvester would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to an agricultural harvester. The agricultural harvester includes a threshing assembly configured to thresh crop material received from a feeder of the agricultural harvester. The threshing assembly, in turn, includes a concave and a rotor positioned relative to the concave such that a gap is defined between the concave and the rotor. Furthermore, the agricultural harvester includes an actuator configured to move the concave relative to the rotor to adjust a size of the gap. Additionally, the agricultural harvester includes a tailings assembly configured to receive incompletely threshed crop material that has passed through the concave. Moreover, the agricultural harvester includes an imaging device configured to capture image data depicting the incompletely threshed crop material present within the tailings assembly and a computing system communicatively coupled to the imaging device. As such, the computing system is configured to determine an amount of the incompletely threshed crop material present within the tailings assembly based on the captured image data. In addition, the computing system is configured to control an operation of the actuator based on the determined amount of the incompletely threshed crop material present within the tailings assembly.

In another aspect, the present subject matter is directed to a system for controlling threshing assembly operation of an agricultural harvester. The system includes a threshing assembly configured to thresh crop material received from a feeder of the agricultural harvester. The threshing assembly, in turn, includes a concave and a rotor positioned relative to the concave such that a gap is defined between the concave and the rotor. Furthermore, the system includes an actuator configured to move the concave relative to the rotor to adjust a size of the gap. Additionally, the system includes a tailings assembly configured to receive incompletely threshed crop material that has passed through the concave. Moreover, the system includes an imaging device configured to capture image data depicting the incompletely threshed crop material present within the tailings assembly and a computing system communicatively coupled to the imaging device. As such, the computing system is configured to determine an amount of the incompletely threshed crop material present within the tailings assembly based on the captured image data. In addition, the computing system is configured to control an operation of the actuator based on the determined amount of the incompletely threshed crop material present within the tailings assembly.

In a further aspect, the present subject matter is directed to a method for controlling threshing assembly operation of an agricultural harvester. The agricultural harvester includes a threshing assembly configured to thresh crop material received from a feeder of the agricultural harvester. The threshing assembly, in turn, includes a concave and a rotor positioned relative to the concave such that a gap is defined between the concave and the rotor. Furthermore, the agricultural harvester further including an actuator configured to move the concave relative to the rotor to adjust a size of the gap and a tailings assembly configured to receive incompletely threshed crop material that has passed through the concave. The method includes receiving, with a computing system, captured image data depicting the incompletely threshed crop material present within the tailings assembly. Additionally, the method includes determining, with the computing system, an amount of the incompletely threshed crop material present within the tailings assembly based on the received image data. Moreover, the method includes controlling, with the computing system, an operation of the actuator based on the determined amount of the incompletely threshed crop material present within the tailings assembly.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which:

FIG. 5 illustrates a flow diagram of one embodiment of a method for controlling threshing assembly operation of an agricultural harvester in accordance with aspects of the present subject matter.

Figure 1:
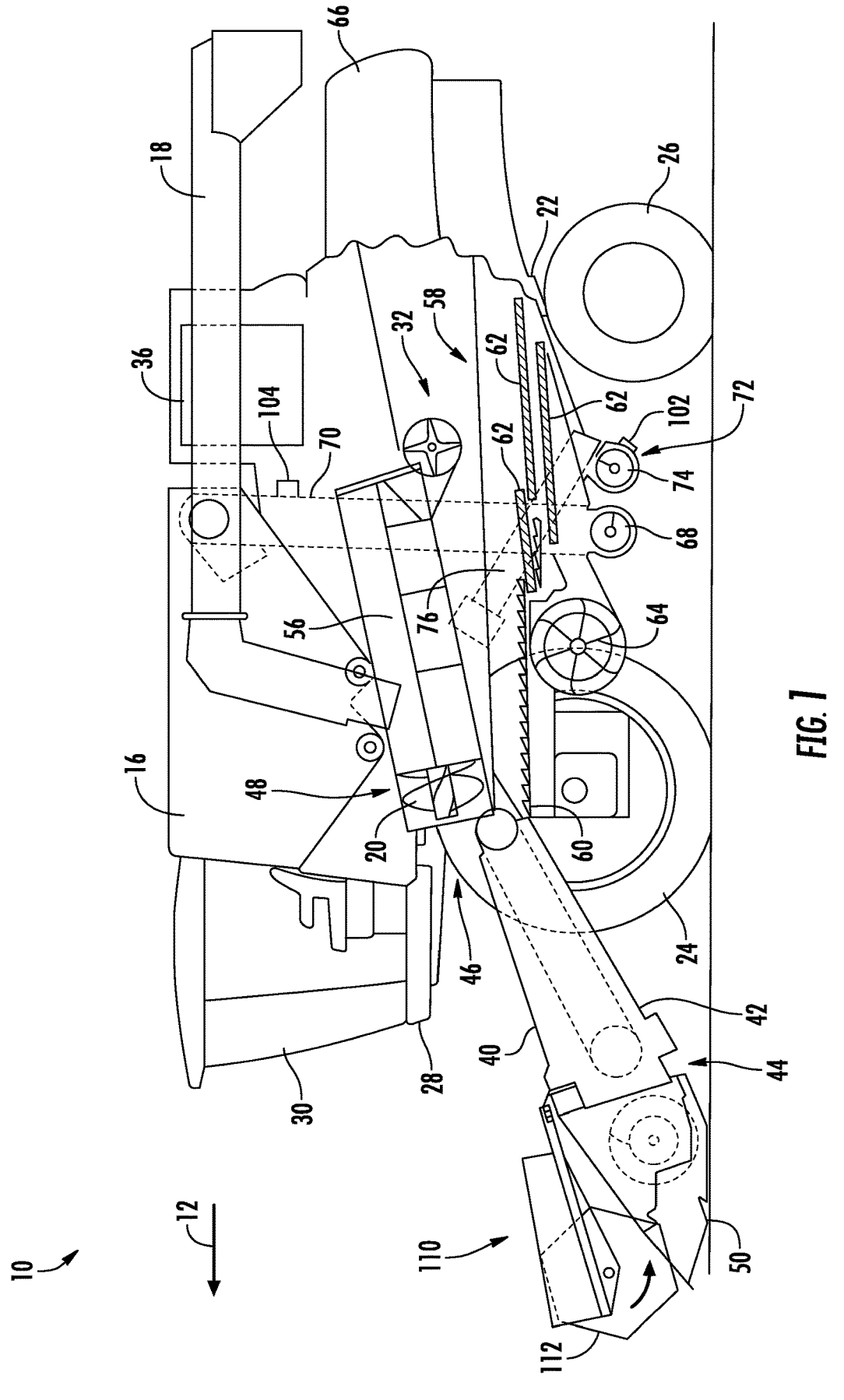
FIG. 1 illustrates a partial sectional side view of one embodiment of an agricultural harvester in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for controlling threshing assembly operation of an agricultural harvester. As will be described below, the harvester includes a threshing assembly configured to thresh crop material received from a feeder of the agricultural harvester. Specifically, the threshing assembly includes a concave and a rotor positioned relative to the concave such that a gap is defined between the concave and the rotor. As the rotor rotates relative to the concave, the harvested crop passes through the gap and is rubbed between the rotor and the inner surfaces of the concave to loosen and separate the grain, seed, or the like from the straw. In this respect, the threshed crop (e.g., the grain/seed) passes through openings in the concave for further processing, while the straw is discharged behind the harvester. The threshed crop is then cleaned (e.g., via a plurality of pans and sieves) and delivered to a crop tank of the harvester for storage. However, some incompletely threshed crop material may pass through the concave. As such, the harvester includes a tailings assembly configured to receive and process the incompletely threshed crop material that has passed through the concave.

In several embodiments, a computing system of the disclosed system is configured to control the size of the gap between the concave and the rotor based on the amount of incompletely threshed crop material present within the tailings assembly. Specifically, the computing system is configured to receive image data (e.g., X-ray images) depicting the depicting the incompletely threshed crop material present within the tailings assembly. Moreover, the computing system may analyze the received image data to determine the amount of incompletely threshed crop material present within the tailings assembly. Thereafter, the computing system is configured to control the operation of an actuator(s) configured to adjust the size of the gap based on the determined amount of incompletely threshed crop material. For example, in some embodiments, when the determined amount exceeds an associated predetermined maximum amount (thereby indicating that too much incompletely threshed grain is passing through the concave), the computing system may control the actuator to reduce the size of the gap.

Controlling the size of the gap between the concave and rotor based on the amount of incompletely threshed crop material present within the tailings assembly improves the operation of the agricultural harvester. More specifically, as mentioned above, when the gap between the concave and rotor is too large, large amounts of incompletely threshed crop material may pass through the concave. This may overwhelm the tailings assembly and result in grain/seed being discharged from the harvester onto the ground. However, by the controlling the size of the gap based on the amount of incompletely threshed crop material present within the tailings assembly, the amount of incompletely threshed material passing the through the concave can be reduced. This, in turn, reduces the load on the tailings assembly and the amount of grain/seed discharged from the harvester onto the ground with the straw.

Referring now to the drawings, FIG. 1 illustrates a partial sectional side view of the agricultural harvester 10. In general, the harvester 10 may be configured to travel across a field in a forward direction of travel (indicated by arrow 12) to harvest a crop. While traversing the field, the harvester 10 may be configured to process and store the harvested crop within a crop tank 16 of the harvester 10. Furthermore, the harvested crop may be unloaded from the crop tank 16 for receipt by the crop receiving vehicle (not shown) via a crop discharge tube 18 of the harvester 10. Moreover, in the illustrated embodiment, the harvester 10 is configured as an axial-flow type combine in which the harvested crop is threshed and separated while being advanced by and along a longitudinally arranged rotor 20. However, in alternative embodiments, the harvester 10 may have any other suitable harvester configuration, such as a traverse-flow type configuration.

The harvester 10 may include a chassis or main frame 22 configured to support and/or couple to various components of the harvester 10. For example, in several embodiments, the harvester 10 may include a pair of driven, front wheels 24 and a pair of steerable, rear wheels 26 coupled to the frame 22. As such, the wheels 24, 26 may be configured to support the harvester 10 relative to the ground and move the harvester 10 in the forward direction of travel 12. Furthermore, the harvester 10 may include an operator's platform 28 having an operator's cab 30, a crop processing system 32, the crop tank 16, and the crop discharge tube 18 supported by the frame 22. As will be described below, the crop processing system 32 may be configured to perform various processing operations on the harvested crop as the crop processing system 32 transfers the harvested crop between a harvesting implement 34 (e.g., a header) of the harvester 10 and the crop tank 16. Furthermore, the harvester 10 may include an engine 36 and a transmission (not shown) mounted on the frame 22. The transmission may be operably coupled to the engine 36 and may provide variably adjusted gear ratios for transferring engine power to the wheels 24 via a drive axle assembly (or via axles if multiple drive axles are employed).

Furthermore, as shown in FIG. 1, the harvester 10 includes a feeder 40 that couples to and supports the harvesting implement 34. More specifically, the feeder 40 may include a feeder housing 42 extending from the forward end 44 to an aft end 46. As such, the forward end 44 of the feeder housing 42 may be coupled to harvesting implement 34. Moreover, the aft end 46 of the feeder housing 42 may be coupled to the frame 22 adjacent to a threshing assembly 48 of the crop processing system 32 such that the harvesting implement 34 may move relative to the field surface in the vertical direction.

As the harvester 10 is propelled in the forward direction of travel 12 over the field, the crop material is severed from the stubble by a cutter bar 50 at the front of the harvesting implement 34. The harvested crop material is delivered to the forward end 44 of the feeder housing 42 (e.g., via a conveyor belt, auger, etc.), which supplies the harvested crop material to the threshing assembly 48. As will be described below, the threshing assembly 48 may include a rotor cage 56 in which the rotor 20 is rotated to thresh and separate the harvested crop received therein. In this respect, the harvested crop is rubbed and beaten between the rotor 20 and the inner surfaces of the rotor cage 56 to loosen and separate the grain, seed, or the like from the straw.

The threshed crop separated by the threshing assembly 48 may fall onto a crop cleaning assembly 58 of the crop processing system 32. In general, the crop cleaning assembly 58 may include a series of pans 60 and associated sieves 62. In general, the separated harvested crop may be spread out via the oscillation of pans 60 and/or sieves 62 and may eventually fall through apertures defined by the sieves 62. Additionally, a cleaning fan 64 may be positioned adjacent to one or more of the sieves 62 to provide an air flow through the sieves 62 that removes chaff and other impurities from the harvested crop. For instance, the fan 64 may blow the impurities off the harvested crop for discharge from the harvester 10 through the outlet of a straw hood 66 positioned at the back end of the harvester 10. The cleaned harvested crop passing through the sieves 62 may then fall into a trough of a cleaned crop auger 68, which may be configured to transfer the harvested crop to an elevator 70 for delivery to the crop tank 16.

Additionally, the harvester 10 includes a tailings assembly 72. In general, the tailings assembly 72 is configured to receive and process incompletely threshed crop material that has passed through the threshing assembly 48 and the crop cleaning assembly 58. More specifically, incompletely threshed crop material (e.g., grain that is still at least partially attached the straw or chaff) may pass through the rotor cage 56 and the crop cleaning system 58 for delivery to the tailings assembly 72. The tailings assembly 72, in turn, processes (e.g., threshes and separates) the incompletely threshed crop material and returns the processed crop material to the pan(s) 60 for cleaning.

The tailings assembly 72 may have any suitable configuration that allows the threshing assembly 48 to operate as described above. Specifically, in several embodiments, the tailings assembly 72 includes a tailings auger 74, a tailings processor (not shown), and a return auger 76. In such embodiments, the tailings auger 74 conveys the incompletely threshed crop material received from the crop cleaning system 58 in a lateral direction to the tailings processor. The lateral direction extends perpendicular to a direction of travel 12 (i.e., the lateral direction extends into and out of the page in FIG. 1). The tailings processor may, in turn, include a rotor (not shown) and a housing (not shown) in which the rotor rotates. Thus, the grain/seed of the incompletely threshed crop material may then be separated from the remaining straw/chaff. Thereafter, the crop material processed by the tailings processor is returned to the pans(s) 60 via the return auger 76.

Moreover, the agricultural harvester 10 includes first and second imaging devices 102, 104. Specifically, the first imaging device 102 is configured to capture image data depicting the incompletely threshed crop material present within the tailings assembly 72. Conversely, the second imaging device 104 is configured to capture image data depicting the cleaned crop being transported by the elevator 70 to the crop tank 16. As will be described below, the image data captured by the first and/or second imaging devices may be used to control the operation of the threshing assembly 48.

In general, the first and second imaging devices 102, 104 may correspond to any suitable devices configured to capture images or other image data depicting the incompletely threshed crop material present within the tailings assembly 72 and the cleaned crop being transported by the elevator 70, respectively. For example, in one embodiment, the first and second imaging devices 102, 104 may correspond to X-ray cameras configured to capture X-ray images of the incompletely threshed crop material present within the tailings assembly 72 and the cleaned crop being transported by the elevator 70. However, in alternative embodiments, the imaging device(s) 102 may correspond to any other suitable sensing device(s) configured to capture images or image-like data.

The first and second imaging devices 102, 104 may be installed at any suitable location(s) that allow the first and second imaging devices 102, 104 to capture images depicting the incompletely threshed crop material present within the tailings assembly 72 and the cleaned crop being transported by the elevator 70, respectively. For example, in some embodiments, the first imaging device 102 may be positioned relative to the tailings assembly 72 such that a portion of the tailings auger 74 is present within its field of view. Additionally, in some embodiments, the second imaging device 104 may be positioned relative to the elevator 70 such that a portion of the cleaned crop material being transported to the crop tank 16 is within its field of view. However, in alternative embodiments, the first and second imaging devices 102, 104 may be installed at any other suitable locations within the harvester 10. Additionally, any suitable number of first and/or second imaging devices 102, 104 may be installed on the harvester 10.

Figure 2:
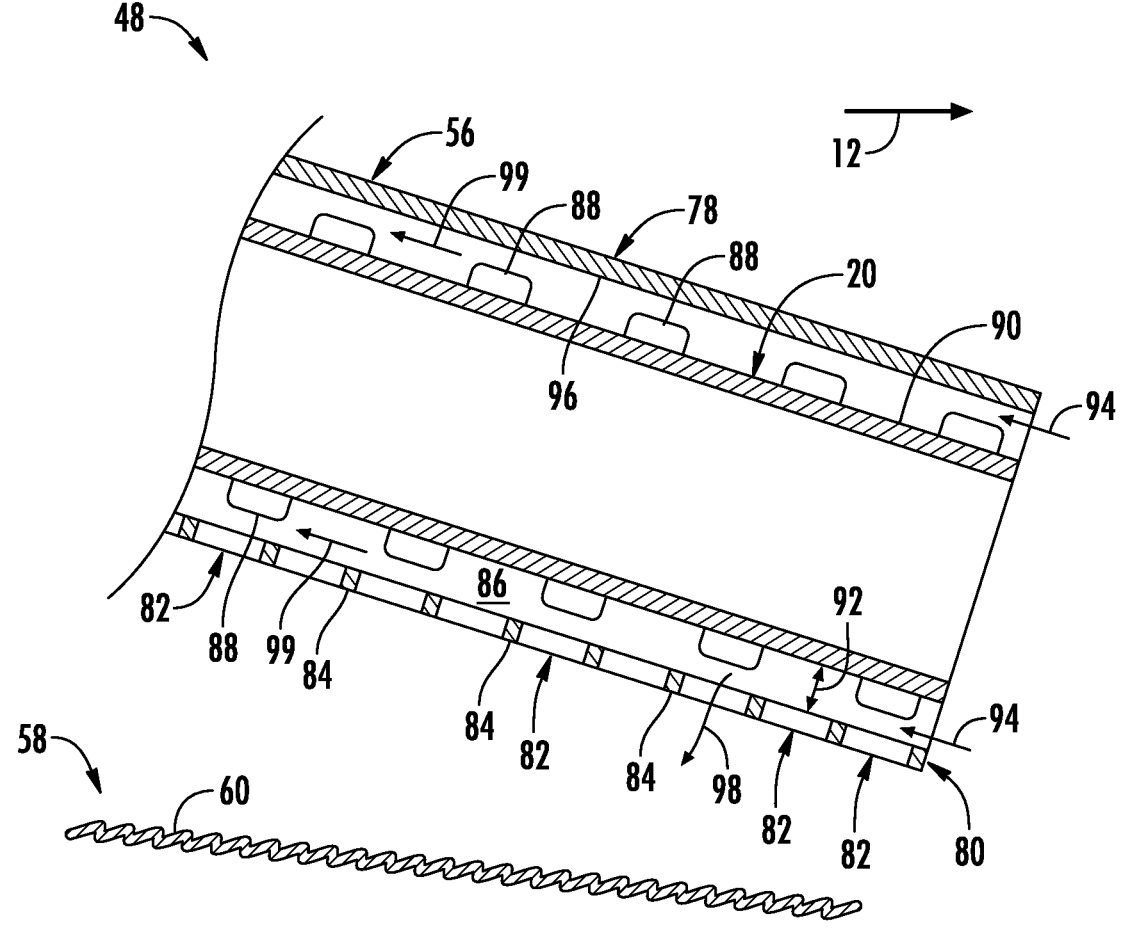
FIG. 2 illustrates a cross-sectional side view of one embodiment of a threshing assembly of an agricultural harvester in accordance with aspects of the present subject matter.

FIG. 2 illustrates a cross-sectional side view of the threshing assembly 48 of the agricultural harvester 10. As mentioned above, the threshing assembly 48 includes a rotor cage 56 and a rotor 20 rotatably positioned within the rotor cage 56. Specifically, in several embodiments, the rotor cage 56 includes a solid or non-perforated portion 78 and a perforated concave 80. In general, the solid portion 78 may form the top and sides of the rotor cage 56, while the concave 80 may form the bottom of the rotor cage 56. The concave 80, in turn, defines a plurality of openings 82 through which the threshed crop material pass. For example, in one embodiment, the concave 80 may be formed from a plurality of rods, beams, or other structural members 84 coupled together such that the concave 80 has a grate-like configuration. In some embodiments, the rotor cage 56 may include a fixed grate-like portion (not shown) positioned aft of the concave 80 such that the fixed grate-like portion forms a portion of the bottom of the rotor cage 56. Moreover, the rotor cage 56 may generally have an annular shape such that a cylindrical chamber 86 defined therein.

As shown, the rotor 20 is rotatably positioned within the cylindrical chamber 86 of the rotor cage 56. Specifically, in several embodiments, the rotor 20 may have an annular shape and may include blades or other projections 88 extending outward from its outer surface 90 toward the rotor cage 56. Furthermore, the rotor 20 may be positioned relative to the concave 80 such that a gap (e.g., as indicated by arrow 92 in FIG. 2) is defined between the concave 80 and the rotor 20. As will be described below, the size of the gap 92 may be adjusted based on the image data captured by the first and second imaging devices 102, 104 to control the operation of the threshing assembly 48.

As mentioned above, the threshing assembly 48 is configured to thresh or otherwise separate the grain, seed, or the like of the harvested crop material from the associated straw. More specifically, harvested crop material (indicated by arrows 94 in FIG. 2) is fed into the cylindrical chamber 86 from the feeder 40. As the rotor 20 rotates relative to the rotor cage 56, the harvested crop 94 is rubbed between the outer surface/projections 90/88 of the rotor 20 and an inner surface 96 of the rotor cage 56. Such rubbing, in turn, separates the grain/seed (indicated by arrow 98 in FIG. 2) of the harvested crop 94 from the associated straw (indicated by arrows 99 in FIG. 2). The grain/seed 98 (as well as chaff and some incompletely threshed crop material) falls through the openings 82 in the concave 80 and onto the pan(s) 60 of the cleaning system 58. The rotation of the rotor 20 conveys the straw 99 rearward through the cylindrical chamber 86 toward the aft of the harvester 10 for discharge via the straw hood 66 (FIG. 1).

It should be further appreciated that the configuration of the agricultural harvester 10 described above and shown in FIGS. 1 and 2 is provided only to place the present subject matter in an exemplary field of use. Thus, it should be appreciated that the present subject matter may be readily adaptable to any manner of agricultural harvester configuration.

Figure 3:
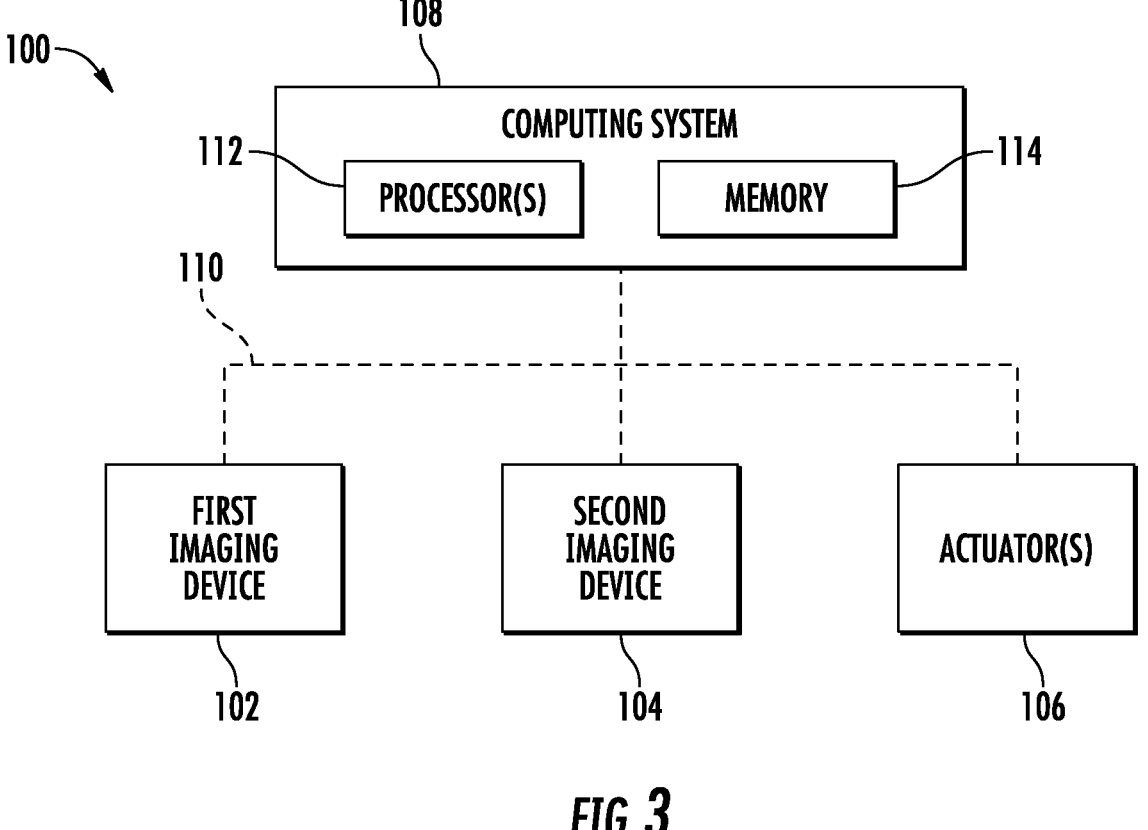
FIG. 3 illustrates a schematic view of one embodiment of a system for controlling threshing assembly operation of an agricultural harvester in accordance with aspects of the present subject matter.

Referring now to FIG. 3, a schematic view of one embodiment of a system 100 for controlling threshing assembly operation of an agricultural harvester is illustrated in accordance with aspects of the present subject matter. In general, the system 100 will be described herein with reference to the agricultural harvester 10 described above with reference to FIGS. 1 and 2. However, it should be appreciated by those of ordinary skill in the art that the disclosed system 100 may generally be utilized with agricultural harvester having any other suitable harvester configuration.

As shown in FIG. 3, the system 100 may include one or more components of the agricultural harvester 10, such as the first and second imaging devices 102, 104. Additionally, the system 100 may include one or more actuators 106 of the harvester 10. In general, the actuator(s) 106 is configured to move the concave 80 relative to the rotor 20 to adjust the size of the gap 92 (e.g., the radial distance defined between the concave 80 and the rotor 20). As will be described below, adjusting the size of the gap 92 may reduce the amount of unthreshed crop material passing through the concave and the amount of the cleaned crop that is damaged. In this respect, the actuator(s) 106 may be configured as any suitable type(s) of actuator(s), such as hydraulic cylinder(s), pneumatic cylinder(s), electric linear actuator(s), and/or the like.

Moreover, the system 100 includes a computing system 108 communicatively coupled to one or more components of the harvester 10 and/or the system 100 to allow the operation of such components to be electronically or automatically controlled by the computing system 108. For instance, the computing system 108 may be communicatively coupled to the first and second imaging devices 102, 104 via a communicative link 110. As such, the computing system 108 may be configured to receive image data from the first and second imaging devices 102, 104 depicting the incompletely threshed crop material present within the tailings assembly 72 and the cleaned crop being transported by the elevator 70, respectively. Furthermore, the computing system 108 may be communicatively coupled to the actuator(s) 106 via the communicative link 110. In this respect, the computing system 108 may be configured to control the operation of the actuator(s) 106 to adjust the size of the gap 92 defined between the concave 80 and the rotor 20. In addition, the computing system 108 may be communicatively coupled to any other suitable components of the harvester 10 and/or the system 100.

In general, the computing system 108 may comprise one or more processor-based devices, such as a given controller or computing device or any suitable combination of controllers or computing devices. Thus, in several embodiments, the computing system 108 may include one or more processor(s) 112 and associated memory device(s) 114 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 114 of the computing system 108 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 114 may generally be configured to store suitable computer-readable instructions that, when implemented by the processor(s) 112, configure the computing system 108 to perform various computer-implemented functions, such as one or more aspects of the methods and algorithms that will be described herein. In addition, the computing system 108 may also include various other suitable components, such as a communications circuit or module, one or more input/output channels, a data/control bus and/or the like.

The various functions of the computing system 108 may be performed by a single processor-based device or may be distributed across any number of processor-based devices, in which instance such devices may be considered to form part of the computing system 108. For instance, the functions of the computing system 108 may be distributed across multiple application-specific controllers or computing devices, such as a navigation controller, an engine controller, a transmission controller, and/or the like.

Figure 4:
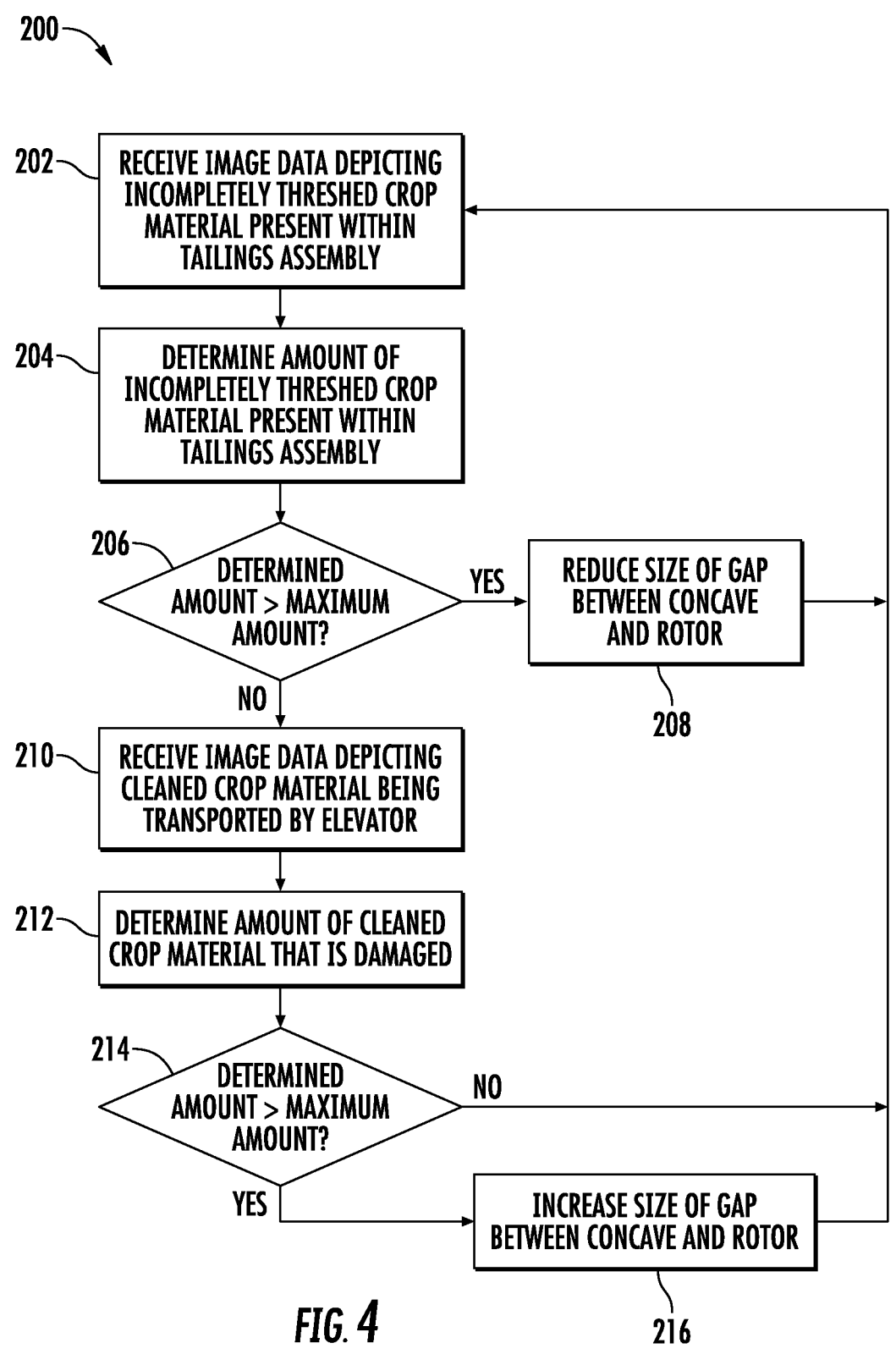
FIG. 4 illustrates a flow diagram providing one embodiment of example control logic for controlling threshing assembly operation of an agricultural harvester in accordance with aspects of the present subject matter.

Referring now to FIG. 4, a flow diagram of one embodiment of example control logic 200 that may be executed by the computing system 108 (or any other suitable computing system) for controlling threshing assembly operation of an agricultural harvester is illustrated in accordance with aspects of the present subject matter. Specifically, the control logic 200 shown in FIG. 4 is representative of steps of one embodiment of an algorithm that can be executed to control threshing assembly operation of an agricultural harvester in a manner that simultaneously reduces the amount of unthreshed crop material passing through the concave and the amount of the cleaned crop that is damaged. Thus, in several embodiments, the control logic 200 may be advantageously utilized in association with a system installed on or forming part of an agricultural harvester to allow for real-time control of the threshing assembly operation without requiring substantial computing resources and/or processing time. However, in other embodiments, the control logic 200 may be used in association with any other suitable system, application, and/or the like for controlling threshing assembly operation of an agricultural harvester.

As shown in FIG. 4, at (202), the control logic 200 includes receiving image data depicting incompletely threshed crop material present within a tailings assembly of an agricultural harvester. Specifically, as mentioned above, in several embodiments, the computing system 108 may be communicatively coupled to the first imaging device 102 via the communicative link 110. The first imaging device 102, in turn, captures image data (e.g., X-ray images) depicting the incompletely threshed crop material present within the tailings assembly 72 of the harvester 10. In this respect, as the harvester 10 travels across the field to perform a harvesting operation thereon, the computing system 108 receives the image data from the first imaging device 102.

Furthermore, at (204), the control logic 200 includes determining the amount of incompletely threshed crop material present within the tailings assembly based on the captured image data. Specifically, in several embodiments, the computing system 108 may analyze the image data received at (202) to determine the amount of incompletely threshed crop material present within the tailings assembly 72. For example, as mentioned above, in some embodiments, the received image data may be X-ray images or other X-ray image data. In such embodiments, the computing system 108 may analyze the captured X-ray image data to determine the portion (e.g., the percentage) of the incompletely threshed crop material present within the tailings assembly 72 that is grain/seed.

Additionally, at (206), the control logic 200 includes comparing the determined amount of incompletely threshed crop material present within the tailings assembly to a predetermined maximum amount. More specifically, as mentioned above, incompletely threshed crop material that passes through the concave 80 is routed to the tailings assembly 72 for further processing. However, when too much incompletely threshed crop material is present within the tailings assembly 72, the tailings assembly 72 may be unable to process the incompletely threshed crop material such that some of the grain/seed from the incompletely threshed crop material is discharged onto the ground behind the harvester 10 with the straw/chaff. As such, the computing system 108 may compare the amount of incompletely threshed crop material present within the tailings assembly 72 determined at (204) (e.g., the portion of the incompletely threshed crop material present within the tailings assembly 72 that is grain/seed) to an associated predetermined maximum amount or threshold.

When it is determined at (206) that the amount of incompletely threshed crop material present within the tailings assembly exceeds the associated maximum amount, the control logic 200 includes, at (208), reducing the size of the gap defined between a concave of the harvester and a rotor of the harvester. Specifically, as mentioned above, the computing system 108 may be communicatively coupled to the actuator(s) 106 via the communicative link 110. The actuator(s) 106 is, in turn, configured to move the concave 80 relative to the rotor 20 to adjust the size of the gap 92 defined therebetween. As such, when the amount of incompletely threshed crop material present within the tailings assembly 72 exceeds the predetermined maximum amount, the computing system 108 may control the operation of the actuator(s) 106 such that the size of the gap 92 is reduced. Reducing the size of the gap 92, in turn, reduces the amount of unthreshed crop material passing through the openings 82 of the concave 80 and into the crop cleaning system 58. For example, in such instances, the computing system 108 may transmit control signals to the actuator(s) 106 via the communicative link 110. The control signals, in turn, instruct the actuator(s) 106 to move the concave 80 closer to the rotor 20 such that the size of the gap 92 therebetween is reduced. Conversely, when it is determined at (206) that the amount of incompletely threshed crop material present within the tailings assembly falls below the predetermined maximum amount, the control logic 200 proceeds to (210).

In alternative embodiments, the computing system 108 may control the operation of the actuator(s) 106 based on different ranges of the amount of incompletely threshed crop material present within the tailings assembly 72. For example, the computing system 108 compare the amount of incompletely threshed crop material present within the tailings assembly 72 determined at (204) to a predetermined first range. When the determined amount is within the first range, the computing system 108 may control the operation of the actuator(s) 106 such that the gap 92 between the concave 80 and the rotor 20 is adjusted to a first size. Conversely, when the determined amount falls outside of the first range, the computing system 108 may compare the determined amount to a predetermined second range, with the second range differing from the first range. When the determined amount is within the second range, the computing system 108 may control the operation of the actuator(s) 106 such that the gap 92 is adjusted to a second size, with the second size differing from the first size. In such embodiments, the computing system 108 may be configured to compare the determined amount to any other suitable number of predetermined ranges. For example, in one embodiment, the computing system 108 may compare the determined amount to high, medium, and low ranges, each with an corresponding gap size.

Moreover, as shown in FIG. 4, at (210), the control logic 200 includes receiving image data depicting the cleaned crop being transported by an elevator of the agricultural harvester. Specifically, as mentioned above, in several embodiments, the computing system 108 may be communicatively coupled to the second imaging device 104 via the communicative link 110. The second imaging device 104, in turn, captures image data (e.g., X-ray images) depicting the cleaned crop being transported by the elevator 70 to the crop tank 16. In this respect, as the harvester 10 travels across the field to perform a harvesting operation thereon, the computing system 108 may receive the image data from the second imaging device 104.

In addition, at (212), the control logic 200 includes determining the amount of the cleaned crop being transported by the elevator that is damaged based on the captured image data. Specifically, in several embodiments, the computing system 108 may analyze the image data received at (210) to determine the amount the cleaned crop being transported by the elevator 70 that is damaged.

Furthermore, at (214), the control logic 200 includes comparing the determined amount of cleaned crop being transported by the elevator that is damaged to an associated predetermined maximum amount. More specifically, when the gap 92 between the concave 80 and the rotor 20 is too small, the grain/seed of the harvested crop material may be damaged. As such, the computing system 108 may compare the amount of the cleaned crop being transported by the elevator 70 that is damaged as determined at (212) to an associated predetermined maximum amount or threshold. When it is determined at (214) that the amount of the cleaned crop being transported by the elevator 70 that is damaged falls below the associated maximum amount, the gap 92 is sufficiently large such that little to no grain/seed is being damaged. In such instances, the control logic 200 returns to (202).

Conversely, when it is determined at (214) that the amount of the cleaned crop being transported by the elevator that is damaged exceeds the associated maximum amount, the control logic 200 includes, at (216), increasing the size of the gap defined between the concave and the rotor. Specifically, when the amount of the cleaned crop being transported by the elevator 70 that is damaged exceeds the associated maximum amount, the computing system 108 may control the operation of the actuator(s) 106 such that the size of the gap 92 is increased. Increasing the size of the gap 92, in turn, reduces the amount of cleaned grain/seed delivered to the crop tank 16 that is damaged. For example, in such instances, the computing system 108 may transmit control signals to the actuator(s) 106 via the communicative link 110. The control signals, in turn, instruct the actuator(s) 106 to move the concave 80 further from the rotor 20 such that the size of the gap 92 therebetween is increased.

Referring now to FIG. 5, a flow diagram of one embodiment of a method 300 for controlling threshing assembly operation of an agricultural harvester is illustrated in accordance with aspects of the present subject matter. In general, the method 300 will be described herein with reference to the agricultural harvester 10 and the system 100 described above with reference to FIGS. 1-4. However, it should be appreciated by those of ordinary skill in the art that the disclosed method 300 may generally be implemented with any agricultural harvester having any suitable harvester configuration and/or within any system having any suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (302), the method 300 may include receiving, with a computing system, captured image data depicting the incompletely threshed crop material present within a tailings assembly of an agricultural harvester. For instance, as described above, the computing system 108 may be configured to receive image data from the first imaging device 102. Such image data, in turn, depicts the amount of incompletely unthreshed crop material present within the tailings assembly 72 of the agricultural harvester 10.

Additionally, at (304), the method 300 may include determining, with the computing system, the amount of the incompletely threshed crop material present within the tailings assembly based on the received image data. For instance, as described above, the computing system 108 may be configured to determine the amount of the incompletely threshed crop material present within the tailings assembly 72 based on the received image data.

Moreover, as shown in FIG. 5, at (306), the method 300 may include controlling, with the computing system, the operation of an actuator configured to adjust the size of a gap defined between a concave of the agricultural harvester and a rotor of the agricultural harvester based on the determined amount of the incompletely threshed crop material present within the tailings assembly. For instance, as described above, the computing system 108 may be configured to control the operation of the actuator(s) 106 to adjust the size of the gap 92 defined between the concave 80 and the rotor 20 based on the determined amount of the incompletely threshed crop material present within the tailings assembly 72.

It is to be understood that the steps of the control logic 200 and the method 300 are performed by the computing system 108 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system 108 described herein, such as the control logic 200 and the method 300, is implemented in software code or instructions which are tangibly stored on a tangible computer readable medium. The computing system 108 loads the software code or instructions via a direct interface with the computer readable medium or via a wired and/or wireless network. Upon loading and executing such software code or instructions by the computing system 108, the computing system 108 may perform any of the functionality of the computing system 108 described herein, including any steps of the control logic 200 and the method 300 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. An agricultural harvester, comprising:
a threshing assembly that threshes crop material received from a feeder of the agricultural harvester, the threshing assembly including a concave and a rotor positioned relative to the concave such that a gap is defined between the concave and the rotor;

an actuator that moves the concave relative to the rotor to adjust a size of the gap;

a tailings assembly that receives incompletely threshed crop material that has passed through the concave;

a first imaging device that captures image data depicting the incompletely threshed crop material present within the tailings assembly; and an elevator that transports cleaned crop to a crop storage tank of the agricultural harvester;

a second imaging device that captures image data depicting the cleaned crop being transported by the elevator; and a computing system communicatively coupled to the first imaging device and the second imaging device, the computing system:

determining an amount of the incompletely threshed crop material present within the tailings assembly based on the captured image data;

controlling an operation of the actuator for a first time based on the determined amount of the incompletely threshed crop material present within the tailings assembly;

following the controlling, determining an amount of the cleaned crop being transported by the elevator that is damaged; and controlling the operation of the actuator for a second time based on the determined amount of the cleaned crop being transported by the elevator that is damaged.

2. The agricultural harvester of claim 1, wherein, when controlling the operation of the actuator for the first time, the computing system:

compares the determined amount of the incompletely threshed crop material present within the tailings assembly to a predetermined maximum amount; and when the determined amount of the incompletely threshed crop material present within the tailings assembly exceeds the predetermined maximum amount, controls the operation of the concave to reduce the size of the gap between the concave and the rotor.

3. The agricultural harvester of claim 1, wherein, when controlling the operation of the actuator for the first time, the computing system:

compares the determined amount of the incompletely threshed crop material present within the tailings assembly to a predetermined first range;

when the determined amount of the incompletely threshed crop material present within the tailings assembly is within the predetermined first range, controls the operation of the concave such that the size of the gap between the concave and the rotor is a first size;

compares the determined amount of the incompletely threshed crop material present within the tailings assembly to a predetermined second range; and when the determined amount of the incompletely threshed crop material present within the tailings assembly is within the predetermined second range, controls the operation of the concave such that the size of the gap between the concave and the rotor is a second size, the first size differing from the second size.

4. The agricultural harvester of claim 1, wherein:

the tailings assembly includes an auger that conveys the incompletely threshed crop material in a lateral direction extending perpendicular to a direction of travel of the agricultural harvester; and the first imaging device is positioned relative to the tailings assembly such that a portion of the auger is present within a field of view of the first imaging device.

5. The agricultural harvester of claim 1, wherein the first imaging device comprises an X-ray camera that captures X-ray image data of the incompletely threshed crop material present within the tailings assembly.

6. A system that controls threshing assembly operation of an agricultural harvester, the system comprising:

a threshing assembly that threshes crop material received from a feeder of the agricultural harvester, the threshing assembly including a concave and a rotor positioned relative to the concave such that a gap is defined between the concave and the rotor;

an actuator that moves the concave relative to the rotor to adjust a size of the gap;

a tailings assembly that receives incompletely threshed crop material that has passed through the concave;

a first imaging device that captures image data depicting the incompletely threshed crop material present within the tailings assembly;

an elevator that transports cleaned crop to a crop storage tank of the agricultural harvester;

a second imaging device that captures image data depicting the cleaned crop being transported by the elevator; and a computing system communicatively coupled to the first imaging device and the second imaging device, the computing system:

determining an amount of the incompletely threshed crop material present within the tailings assembly based on the captured image data;

controlling an operation of the actuator for a first time based on the determined amount of the incompletely threshed crop material present within the tailings assembly;

following the controlling, determining an amount of the cleaned crop being transported by the elevator that is damaged; and controlling the operation of the actuator for a second time based on the determined amount of the cleaned crop being transported by the elevator that is damaged.

7. The system of claim 6, wherein, when controlling the operation of the actuator for the first time, the computing system:

compares the determined amount of the incompletely threshed crop material present within the tailings assembly to a predetermined maximum amount; and when the determined amount of the incompletely threshed crop material present within the tailings assembly exceeds the predetermined maximum amount, controls the operation of the concave to reduce the size of the gap between the concave and the rotor.

8. The system of claim 6, wherein, when controlling the operation of the actuator for the first time, the computing system:

compares the determined amount of the incompletely threshed crop material present within the tailings assembly to a predetermined first range;

when the determined amount of the incompletely threshed crop material present within the tailings assembly is within the predetermined first range, controls the operation of the concave such that the size of the gap between the concave and the rotor is a first size;

compares the determined amount of the incompletely threshed crop material present within the tailings assembly to a predetermined second range; and when the determined amount of the incompletely threshed crop material present within the tailings assembly is within the predetermined second range, controls the operation of the concave such that the size of the gap between the concave and the rotor is a second size, the first size differing from the second size.

9. The system of claim 6, wherein the first imaging device comprises an X-ray camera that captures X-ray image data of the incompletely threshed crop material present within the tailings assembly.

10. The system of claim 9, wherein, when determining the amount of the incompletely threshed crop material present within the tailings assembly, the computing system analyzes the captured X-ray image data to determine a portion of the incompletely threshed crop material present within the tailings assembly that is grain.

11. The system of claim 6, wherein, when controlling the operation of the actuator for the second time, the computing system:

compares the determined amount of cleaned crop being transported by the elevator that is damaged to a predetermined maximum amount; and when the cleaned crop being transported by the elevator that is damaged exceeds the predetermined maximum amount, controls the operation of the concave to increase the size of the gap between the concave and the rotor.

12. The system of claim 6, wherein:

the tailings assembly includes an auger that conveys the incompletely threshed crop material in a lateral direction extending perpendicular to a direction of travel of the agricultural harvester; and the first imaging device is positioned relative to the tailings assembly such that a portion of the auger is present within a field of view of the first imaging device.

13. A method for controlling threshing assembly operation of an agricultural harvester, the agricultural harvester including a threshing assembly that threshes crop material received from a feeder of the agricultural harvester, the threshing assembly including a concave and a rotor positioned relative to the concave such that a gap is defined between the concave and the rotor, the agricultural harvester further including an actuator that moves the concave relative to the rotor to adjust a size of the gap and a tailings assembly that receives incompletely threshed crop material that has passed through the concave, the agricultural harvester further including an elevator that transports cleaned crop to a crop storage tank of the agricultural harvester, the method comprising:

receiving, with a computing system, tailings image data captured by a first imaging device depicting the incompletely threshed crop material present within the tailings assembly;

determining, with the computing system, an amount of the incompletely threshed crop material present within the tailings assembly based on the received image data;

controlling, with the computing system, an operation of the actuator for a first time based on the determined amount of the incompletely threshed crop material present within the tailings assembly; and following the controlling:

receiving, with the computing system, elevator image data captured by a second imaging device depicting the cleaned crop being transported by the elevator;

determining, with the computing system, an amount of the cleaned crop being transported by the elevator that is damaged based on the received elevator image data; and controlling, with the computing system, the operation of the actuator for a second time based on the determined amount of the cleaned crop being transported by the elevator that is damaged.

14. The method of claim 13, wherein controlling the operation of the actuator for the first time comprises:

comparing, with the computing system, the determined amount of the incompletely threshed crop material present within the tailings assembly to a predetermined maximum amount; and when the determined amount of the incompletely threshed crop material present within the tailings assembly exceeds the predetermined maximum amount, controlling, with the computing system, the operation of the concave to reduce the size of the gap between the concave and the rotor.

15. The method of claim 13, wherein controlling the operation of the actuator for the first time comprises:

comparing, with the computing system, the determined amount of the incompletely threshed crop material present within the tailings assembly to a predetermined first range;

when the determined amount of the incompletely threshed crop material present within the tailings assembly is within the predetermined first range, controlling, with the computing system, the operation of the concave such that the size of the gap between the concave and the rotor is a first size;

comparing, with the computing system, the determined amount of the incompletely threshed crop material present within the tailings assembly to a predetermined second range; and when the determined amount of the incompletely threshed crop material present within the tailings assembly is within the predetermined second range, controlling, with the computing system, the operation of the concave such that the size of the gap between the concave and the rotor is a second size, the first size being different than the second size.

16. The method of claim 13, wherein receiving tailings image data comprises receiving, with the computing system, X-ray image data depicting the incompletely threshed crop material present within the tailings assembly.

17. The method of claim 16, wherein determining the amount of the incompletely threshed crop material present within the tailings assembly comprises analyzing, with the computing system, the captured X-ray image data to determine a portion of the incompletely threshed crop material present within the tailings assembly that is grain.

18. The agricultural harvester of claim 1, wherein the amount of the cleaned crop being transported by the elevator that is damaged is determined without accounting for the amount of the incompletely threshed crop material present within the tailings assembly, and wherein the amount of the incompletely threshed crop material present within the tailings assembly is determined without accounting for the amount of the cleaned crop being transported by the elevator that is damaged.

19. The agricultural harvester of claim 1, wherein controlling the operation of the actuator for the first time causes a reduction in the gap defined between the concave and the rotor, and controlling the operation of the actuator for the second time causes an increase in the gap defined between the concave and the rotor.

20. The agricultural harvester of claim 1, wherein, when controlling the operation of the actuator for the first time, the computing system compares the determined amount of the incompletely threshed crop material present within the tailings assembly to a first predetermined maximum amount, and when the determined amount of the incompletely threshed crop material present within the tailings assembly exceeds the first predetermined maximum amount, the computing system controls the operation of the concave to reduce the size of the gap between the concave and the rotor; and wherein, when controlling the operation of the actuator for the second time, the computing system compares the determined amount of cleaned crop being transported by the elevator that is damaged to a second predetermined maximum amount, and when the cleaned crop being transported by the elevator that is damaged exceeds the second predetermined maximum amount, the computing system controls the operation of the concave to increase the size of the gap between the concave and the rotor.

21. The system of claim 6, wherein the amount of the cleaned crop being transported by the elevator that is damaged is determined without accounting for the amount of the incompletely threshed crop material present within the tailings assembly, and wherein the amount of the incompletely threshed crop material present within the tailings assembly is determined without accounting for the amount of the cleaned crop being transported by the elevator that is damaged.

22. The system of claim 6, wherein controlling the operation of the actuator for the first time causes a reduction in the gap defined between the concave and the rotor, and controlling the operation of the actuator for the second time causes an increase in the gap defined between the concave and the rotor.

23. The system of claim 6, wherein, when controlling the operation of the actuator for the first time, the computing system compares the determined amount of the incompletely threshed crop material present within the tailings assembly to a first predetermined maximum amount, and when the determined amount of the incompletely threshed crop material present within the tailings assembly exceeds the first predetermined maximum amount, the computing system controls the operation of the concave to reduce the size of the gap between the concave and the rotor; and wherein, when controlling the operation of the actuator for the second time, the computing system compares the determined amount of cleaned crop being transported by the elevator that is damaged to a second predetermined maximum amount, and when the cleaned crop being transported by the elevator that is damaged exceeds the second predetermined maximum amount, the computing system controls the operation of the concave to increase the size of the gap between the concave and the rotor.

24. The method of claim 13, wherein the amount of the cleaned crop being transported by the elevator that is damaged is determined without accounting for the amount of the incompletely threshed crop material present within the tailings assembly, and wherein the amount of the incompletely threshed crop material present within the tailings assembly is determined without accounting for the amount of the cleaned crop being transported by the elevator that is damaged.

25. The method of claim 13, wherein controlling the operation of the actuator for the first time causes a reduction in the gap defined between the concave and the rotor, and controlling the operation of the actuator for the second time causes an increase in the gap defined between the concave and the rotor.

26. The method of claim 13, wherein, when controlling the operation of the actuator for the first time, the computing system compares the determined amount of the incompletely threshed crop material present within the tailings assembly to a first predetermined maximum amount, and when the determined amount of the incompletely threshed crop material present within the tailings assembly exceeds the first predetermined maximum amount, the computing system controls the operation of the concave to reduce the size of the gap between the concave and the rotor; and wherein, when controlling the operation of the actuator for the second time, the computing system compares the determined amount of cleaned crop being transported by the elevator that is damaged to a second predetermined maximum amount, and when the cleaned crop being transported by the elevator that is damaged exceeds the second predetermined maximum amount, the computing system controls the operation of the concave to increase the size of the gap between the concave and the rotor.

* * * * *